United States Patent
Lo et al.

(10) Patent No.: US 8,014,054 B2
(45) Date of Patent: Sep. 6, 2011

(54) DUAL DISPLAY

(75) Inventors: Kuo-Lung Lo, Taipei County (TW); Pei-Ju Su, Hsinchu (TW); Wei-Yuan Cheng, Taipei County (TW); Jyh-Wen Shiu, Hsinchu County (TW); Hsin-Hung Lee, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 12/691,619

(22) Filed: Jan. 21, 2010

(65) Prior Publication Data

US 2010/0309541 A1    Dec. 9, 2010

(30) Foreign Application Priority Data

Jun. 8, 2009  (TW) ................................ 98118999 A

(51) Int. Cl.
    *G02F 1/03*  (2006.01)
(52) U.S. Cl. ........................ 359/253; 359/245
(58) Field of Classification Search .......... 359/290–292, 359/295, 223–225, 243, 260–263, 298, 198, 359/301–303, 315–318, 237, 242, 253, 276, 359/238, 245, 259, 244
    See application file for complete search history.

(56) References Cited

U.S. PATENT DOCUMENTS

2006/0103909 A1 * 5/2006 Benning et al. ............... 359/237

FOREIGN PATENT DOCUMENTS

| WO | WO 2005/098524 A1 | 10/2005 |
| WO | WO 2006/017129 A2 | 2/2006 |
| WO | WO 2008/142085 A2 | 11/2008 |
| WO | WO 2008142085 A2 * | 11/2008 |

* cited by examiner

*Primary Examiner* — Dawayne A Pinkney

(57) ABSTRACT

A dual display is disclosed, including a first electrowetting display device and a second electrowetting display device, and a reflection transmission switching device therebetween, wherein the first electrowetting display device and the second electrowetting display device have a function of displaying images and can be switched to a transmissive mode. The invention further provides a dual display, comprising a first substrate, a second substrate opposite the first substrate, a first patterned electrode and a second patterned electrode disposed on the first substrate, a reflective layer disposed on the first patterned electrode, a first patterned hydrophobic layer over the first patterned electrode, a second patterned hydrophobic layer over the second patterned electrode, a wall defining a pixel of the dual display, a first non-polar liquid disposed on the first patterned hydrophobic layer, and a second non-polar liquid disposed on the second patterned hydrophobic layer.

26 Claims, 15 Drawing Sheets

DUAL DISPLAY

CROSS REFERENCE

This Application claims priority of Taiwan Patent Application No. 98118999, filed on Jun. 8, 2009, the entirety of which is incorporated by reference herein.

BACKGROUND OF THE INVENTION

1. Field of the Invention

The invention relates to a display with dual displaying function and more particularly to a dual display with electrowetting elements.

2. Description of the Related Art

Currently, thin displays are widely used. Most displays, however, do not have a dual displaying function. For example, WO 2005098524 discloses an electrowetting display structure, WO 2006017129 discloses a transflective electrowetting display structure, and WO 2008142085 discloses an electrowetting display device with an element for switching between transmissive or transflective states. However, the techniques do not provide a dual displaying function.

BRIEF SUMMARY OF INVENTION

Accordingly, the invention provides a display with dual displaying function. The display can be disposed in a window of a building, wherein a display mode can be switched according to outdoor or indoor ambient light to optimize display quality. In addition, the display can be switched to a full display mode with light fully passing through therethrough. Compared to conventional self-luminescence outdoor displays, the display with dual displaying function of the invention can be applied to save energy. Additionally, if used as an advertisement billboard, the display with dual displaying function of the invention can offer convenient switching of advertisements.

An embodiment of the invention provides a dual display, comprising a first electrowetting display device and a second electrowetting display device, and a reflection transmission switching device therebetween, wherein the first electrowetting display device and the second electrowetting display device have a function of displaying images and can be switched to a transmissive mode.

Another embodiment of the invention provides a dual display, comprising a first substrate, a second substrate opposite the first substrate, a first patterned electrode and a second patterned electrode disposed on the first substrate, a reflective layer disposed on the first patterned electrode, a first patterned hydrophobic layer over the first patterned electrode, a second patterned hydrophobic layer over the second patterned electrode, a wall defining a pixel of the dual display, a first non-polar liquid disposed on the first patterned hydrophobic layer, and a second non-polar liquid disposed on the second patterned hydrophobic layer.

A further embodiment of the invention provides a dual display, comprising a first display device and a second display device, and a reflection transmission switching device therebetween, wherein when the first and second display device and the reflection transmission switching device are switched to a transmissive mode, the dual display is transparent, when the reflection transmission switching device is switched to a reflective mode, the first and second display devices can display different images, and when the reflection transmission switching device is switched to a transflective mode, the first and second display devices can present transmissive displays and reflective displays respectively.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
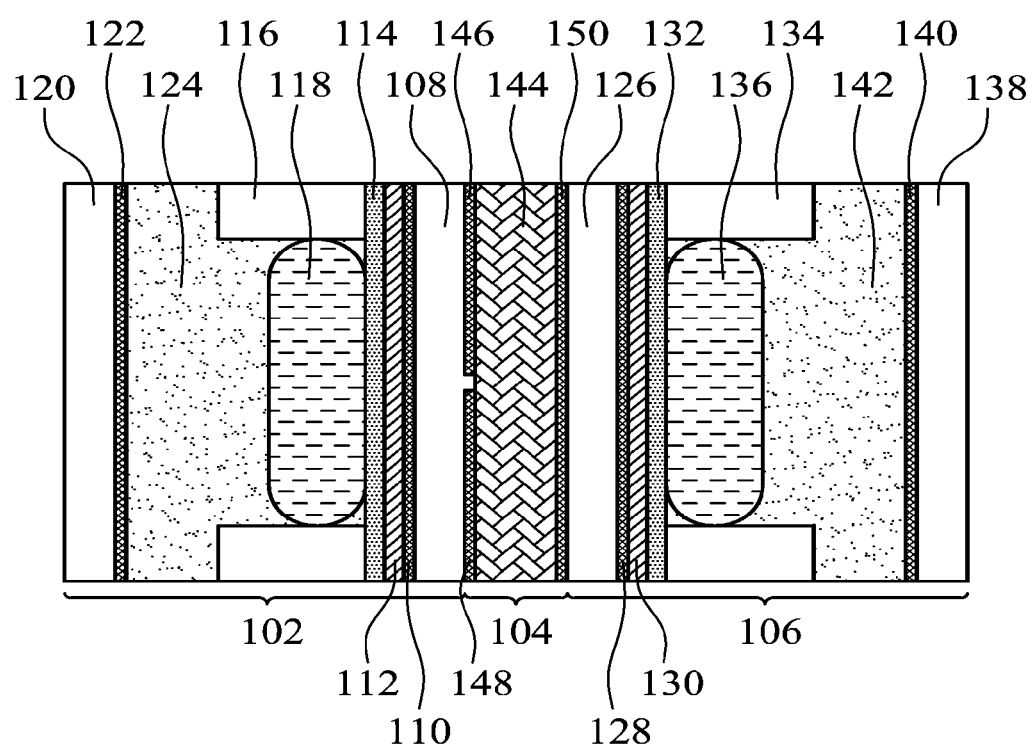
FIG. 1 shows a dual displaying structure of a first embodiment of the invention.

FIG. 1 shows a dual display of an embodiment of the invention. Referring to FIG. 1, the dual display of the embodiment mainly includes two electrowetting display devices 102, 106 and a polymer dispersed liquid crystal (PDLC) 104 therebetween. A first electrowetting display device 102 comprises a first patterned electrode 110 formed on a bottom substrate 108, a dielectric layer 112 formed on the patterned electrode 110 and a hydrophobic layer 114 on the dielectric layer 112. The electrode 110 can be a transparent electrode, for example formed of ITO, IZO or ZnO. The dielectric layer 112 can be silicon nitride, silicon oxide, aluminum oxide or titanium oxide or the combination of these materials. The hydrophobic layer 114 can be a macromolecule including fluorine, a diamond-like carbon thin film or a self assembled monolayer. A top substrate 120 is opposite to the bottom substrate 108. A common electrode 122 is formed on the top substrate 120. A hydrophilic wall 116, a polar liquid 124 and a non-polar liquid 118 are disposed between the top substrate 120 and the bottom substrate 108. The hydrophilic wall 116 can be a resist such as epoxy resin or acrylic resin, the polar liquid 124 can be water, alcohol or electrolyte-containing liquid, and the non-polar liquid 118 can comprise silicon oil, $C_{10}$-$C_{16}$ alkane (such as decane, dodecane, tetradecane or hexadecane), dye, pigment or lumophore. The second electrowetting display device 106 has substantially the same elements as the first electrowetting display device 102, but the second electrowetting display device 106 is minor-symmetrical to the first electrowetting display device 102. As shown in FIG. 1, the second electrowetting display device 106 comprises a patterned electrode 128 formed on a bottom substrate 126, a dielectric layer 130 on the patterned electrode 128, a hydrophobic layer 132 on the dielectric layer 130, a top substrate 138 opposite the bottom substrate 126, a common electrode 140 on the top substrate 138, and a hydrophilic wall 134, a polar liquid 142 and a non-polar liquid 136 between the top substrate 138 and the bottom substrate 126.

A polymer dispersed liquid crystal device 104 is disposed between the first electrowetting display device 102 and the second electrowetting display device 106, wherein the polymer dispersed liquid crystal device 104 comprises first and second patterned electrodes 146, 148 on the bottom substrate 108 of the first electrowetting display device 102, a common electrode 150 on the bottom substrate 126 of the second electrowetting display device 106 and a polymer dispersed liquid crystal liquid crystal layer 144 among the first pattern electrode 146, the second patterned electrode 148 and the common electrode 150.

Figure 7A:
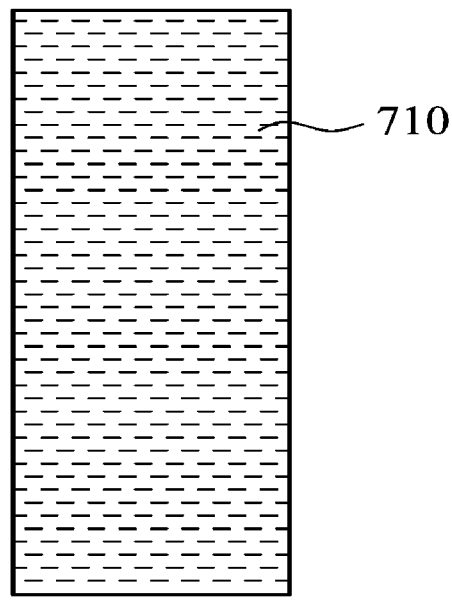
FIG. 7A~FIG. 8B illustrate control of oil drip of the electrowetting display device of an embodiment of the invention.
Figure 7B:
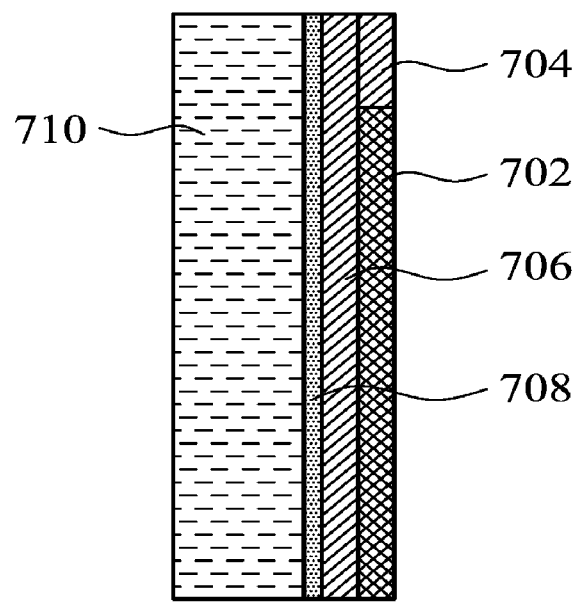
Figure 8A:
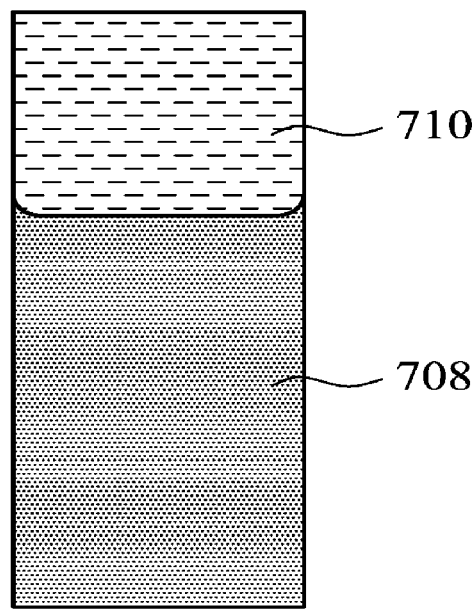
Figure 8B:
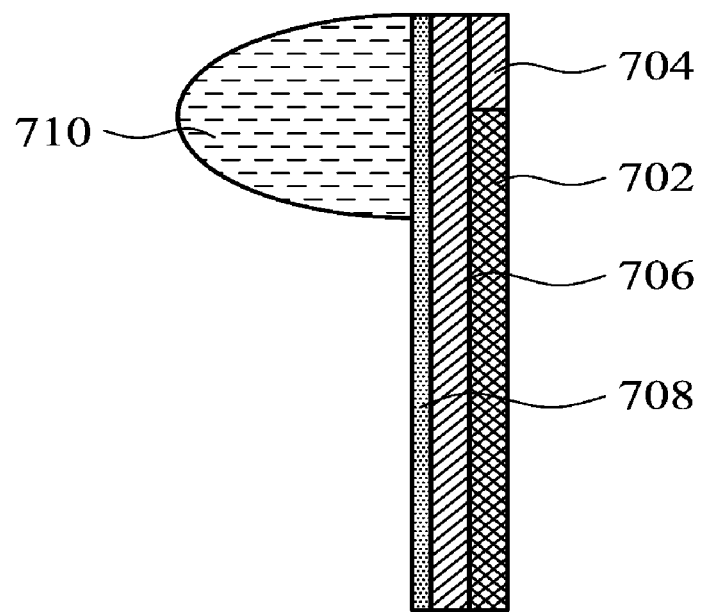

Control of an oil drip of the electrowetting display device of an embodiment of the invention is illustrated in accordance FIG. 7A~FIG. 8B, wherein the non-polar liquid is a printing ink, as an example. First referring to FIG. 7A and FIG. 7B, wherein FIG. 7A shows a top view of a single pixel of an electrowetting display device and FIG. 7B shows a side view of a single pixel of the electrowetting display device, an interval region 704 is disposed between electrodes 702 (only one electrode is shown), and a dielectric layer 706 and a hydrophobic layer 708 are formed on the electrodes 702. The interval region 704 can be filled with dielectric materials as the dielectric layer 706 or other non-conductive materials, such as resist. A printing ink 710 is disposed on the hydrophobic layer 708. As shown in the figure, when the electrode 702 is not applied with voltage, the printing ink 710 remains evenly distributed in the pixel. Referring to FIG. 8A and FIG. 8B, when the electrode 702 is applied with voltage, electrowetting phenomenon is not induced because electric field is not formed in the interval region 704, and the printing ink 710 is pushed toward the interval region 704 to control shrinkage orientation of the printing ink 710.

Figure 2A:
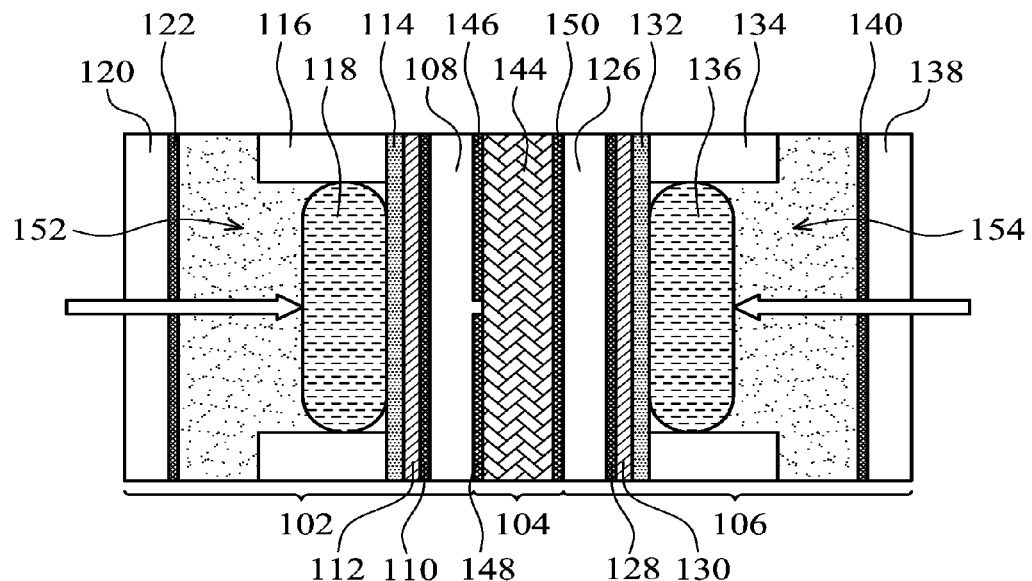
FIG. 2A~FIG. 2G illustrates operation of a dual display of the first embodiment of the invention.
Figure 2B:
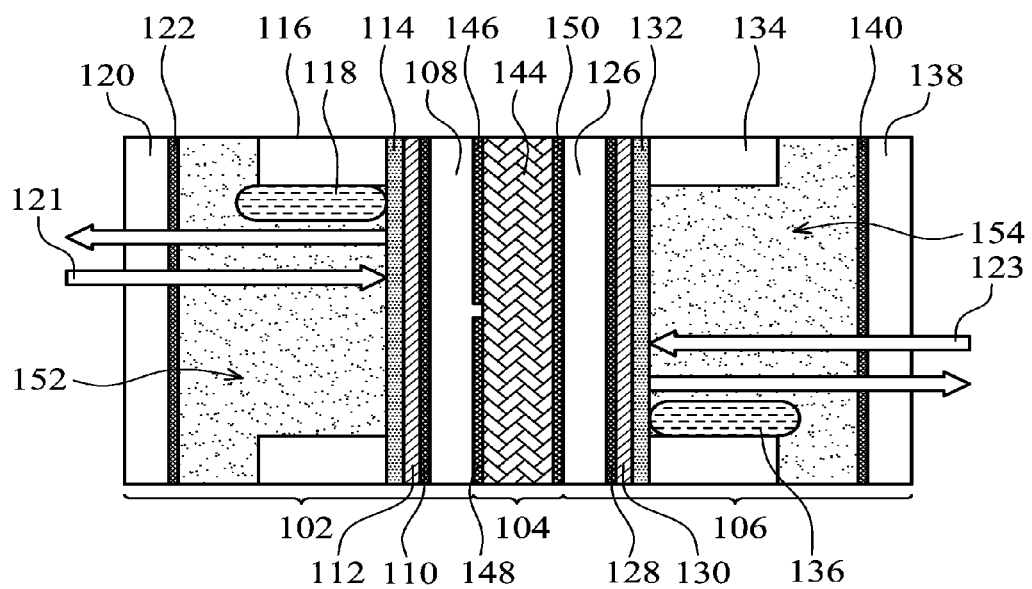

Operation of the dual display of the embodiment is illustrated in accordance with FIG. 2A~FIG. 2G, wherein the first electrowetting display device faces a first viewing side and the second electrowetting display device faces a second viewing side. First, referring to FIG. 2A, when the first patterned electrode 146, the second patterned electrode 148 and the common electrode 150 of the PDLC device 104 do not apply voltage to the polymer dispersed liquid crystal layer 144, the polymer dispersed liquid crystal layer 144 presents a white color, and the first and second electrowetting display devices 102, 106 act as reflective displays. FIG. 2A shows the state when the first displaying pixel 152 is turned off (not applied with voltage) and the second displaying pixel 154 is turned off (not applied with voltage). FIG. 2B shows the state when the first displaying pixel 152 is turned on (applied with voltage) and the second displaying pixel 154 is turned on (applied with voltage), wherein the first light 121 and the second light 123 are reflected light.

Figure 2C:
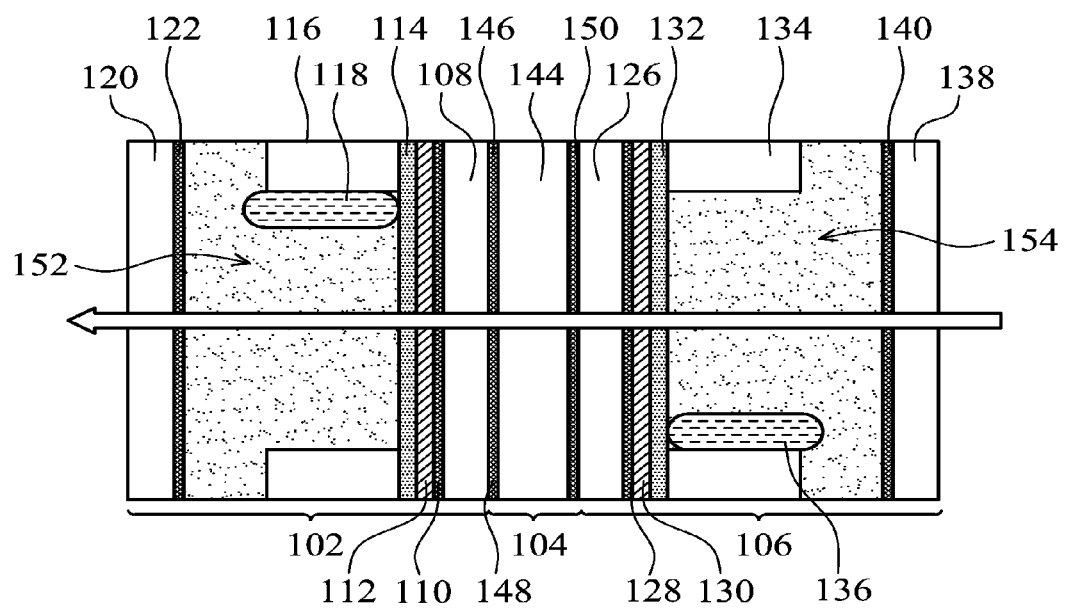

Referring to FIG. 2C, when the polymer dispersed liquid crystal layer 144 of the polymer dispersed liquid crystal device 104 is applied with voltage through the first patterned electrode 146, the second patterned electrode 148 and the common electrode 150, the polymer dispersed liquid crystal layer 144 presents a transparent state, and the first and second electrowetting display devices 102, 106 act as transmissive displays. As shown in FIG. 2C, when both the first displaying pixel 152 and the second displaying pixel 154 are turned on, the dual display of the embodiment is switched to a full transmissive mode.

Figure 2D:
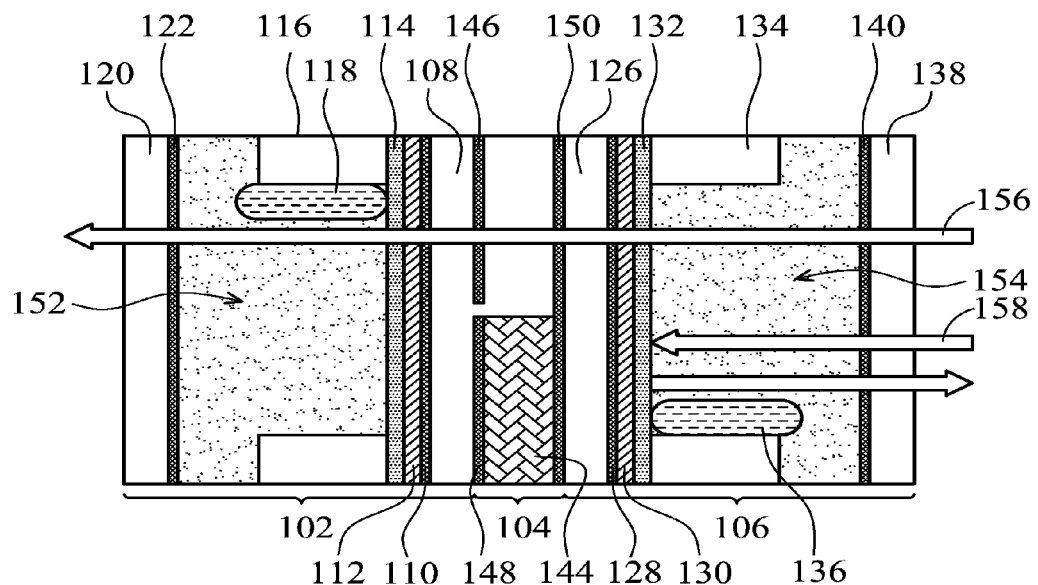
Figure 2E:
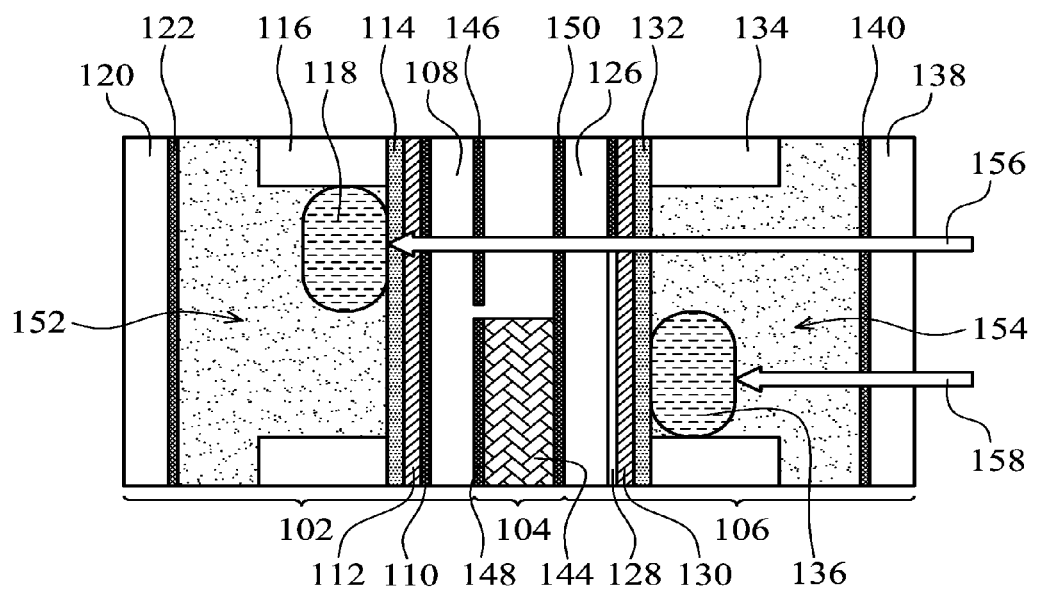

Referring to FIG. 2D and FIG. 2E, when the polymer dispersed liquid crystal layer 144 of the polymer dispersed liquid crystal device 104 is applied with voltage through the first patterned electrode 146 and the common electrode 150, a portion of the polymer dispersed liquid crystal layer 144 corresponding to the first patterned electrode 146(the top half portion in the figure) is presented in a transparent state. The polymer dispersed liquid crystal layer 144 is not applied with voltage through the second patterned electrode 148 at this moment, such that a portion of the polymer dispersed liquid crystal layer 144 corresponding to the second patterned electrode 148 (the bottom half portion in the figure) presents a white color. The non-polar liquid 118 of the first electrowetting display device 102 is controlled by the first patterned electrode 110 to operate at a top half portion of the pixel 152. The first electrowetting display device 102 presents a transmissive display at this moment, in which light source is ambient light 156. The bottom portion of the polymer dispersed liquid crystal device 104 is presented in a reflective mode since the portion of the polymer dispersed liquid crystal layer 144 is not applied with voltage through the second patterned electrode 148. The non-polar liquid 136 of the second electrowetting display device 106 is controlled by the patterned electrode 128 to operate at a bottom half portion of the pixel 154 and the second electrowetting display device 106 presents a reflective display at this moment, in which the light source is ambient light 158. As shown in FIG. 2D, when both the first display pixel 152 and the second pixel 154 are turned on, an ambient light 156 passes through the top half portion of the polymer dispersed liquid crystal device 104 to serve as a light source of the first electrowetting display device 102. In addition, an ambient light 158 is reflected by the bottom half portion of the polymer dispersed liquid crystal device 104 to serve as light source of the second electrowetting display device 106. FIG. 2E show the state when the first electrowetting display device 152 and the second electrowetting display device 154 are turned off.

Figure 2F:
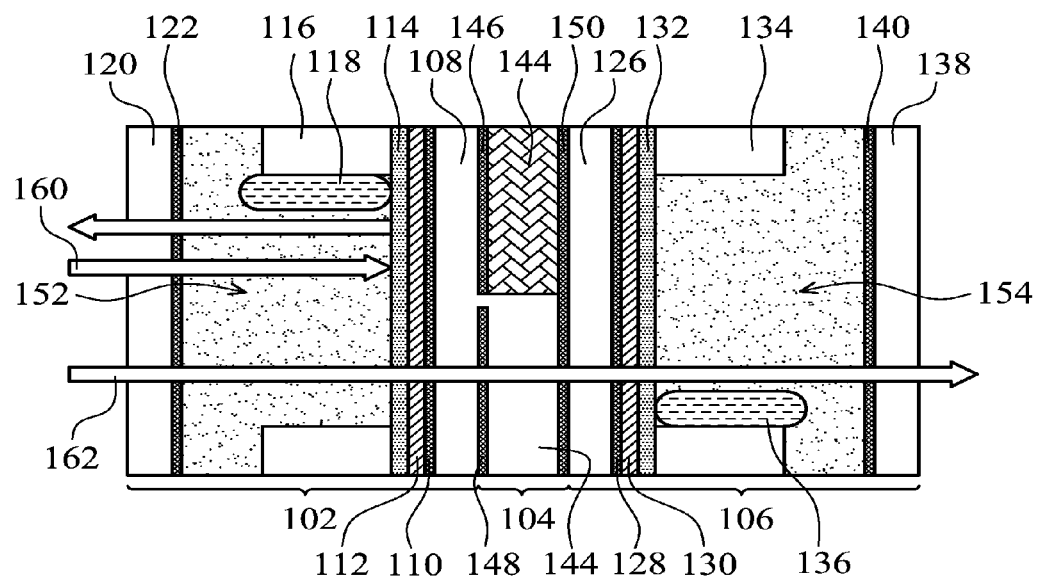
Figure 2G:
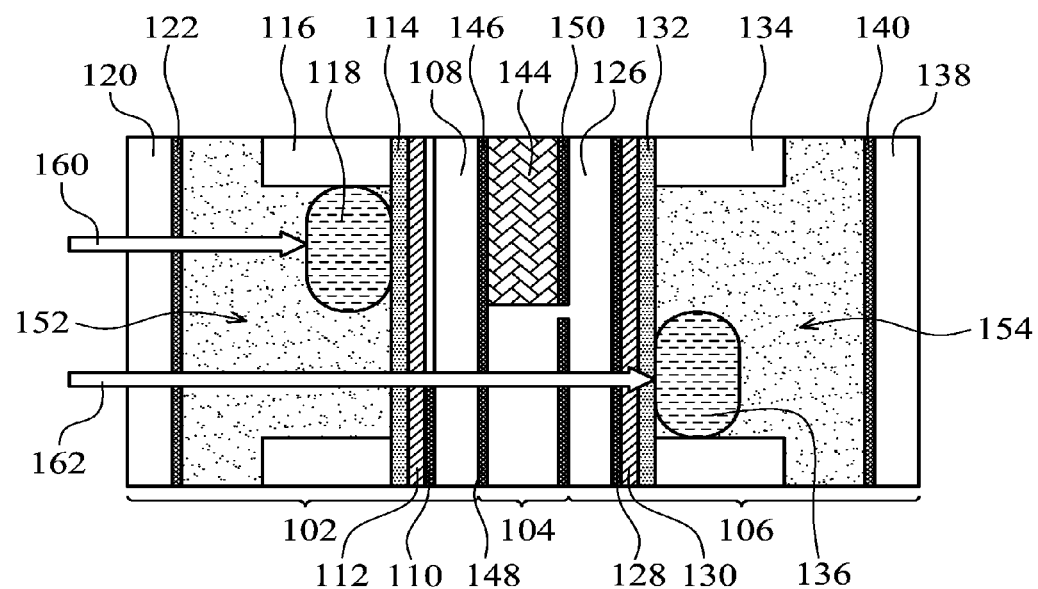

Referring to FIG. 2F and FIG. 2G, when the polymer dispersed liquid crystal layer 144 of the polymer dispersed liquid crystal device 104 is applied with voltage through the second patterned electrode 148 and the common electrode 150, a portion of the polymer dispersed liquid crystal layer 144 corresponding to the second patterned electrode 148 (the bottom half portion in the figure) is presented in a transparent state. The polymer dispersed liquid crystal layer 144 is not applied with voltage through the first patterned electrode 146 at this moment, such that a portion of the polymer dispersed liquid crystal layer 144 corresponding to the first patterned electrode 146 (the top half portion in the figure) presents a white color. The non-polar liquid 118 of the first electrowetting display device 102 is controlled by the patterned electrode 110 to operate at a top half portion of the pixel 152 and the first electrowetting display device 102 presents a reflective display at this moment, in which light source is ambient light 160. The bottom portion of the polymer dispersed liquid crystal device 104 presents a transparent mode since the portion of the polymer dispersed liquid crystal layer 144 is applied with voltage through the second patterned electrode 148. The non-polar liquid 136 of the second electrowetting display device 106 is controlled by the patterned electrode 128 to operate at a bottom half portion of the pixel 154 and the second electrowetting display device 106 presents a transmissive display at this moment, in which light source is the ambient light 162 passing through the first electrowetting display device 102. As shown in FIG. 2F, when both the first display pixel 152 and the second pixel 154 are turned on, an ambient light 162 passes through the bottom half portion of the polymer dispersed liquid crystal device 104 to serve as a light source of the second electrowetting display device 106. In addition, an ambient light 160 is reflected by the top half portion of the polymer dispersed liquid crystal device 104 to serve as light source of the first electrowetting display device 102. FIG. 2G shows the state when the first electrowetting display pixel 152 and the second electrowetting display pixel 154 are turned off.

Figure 3:
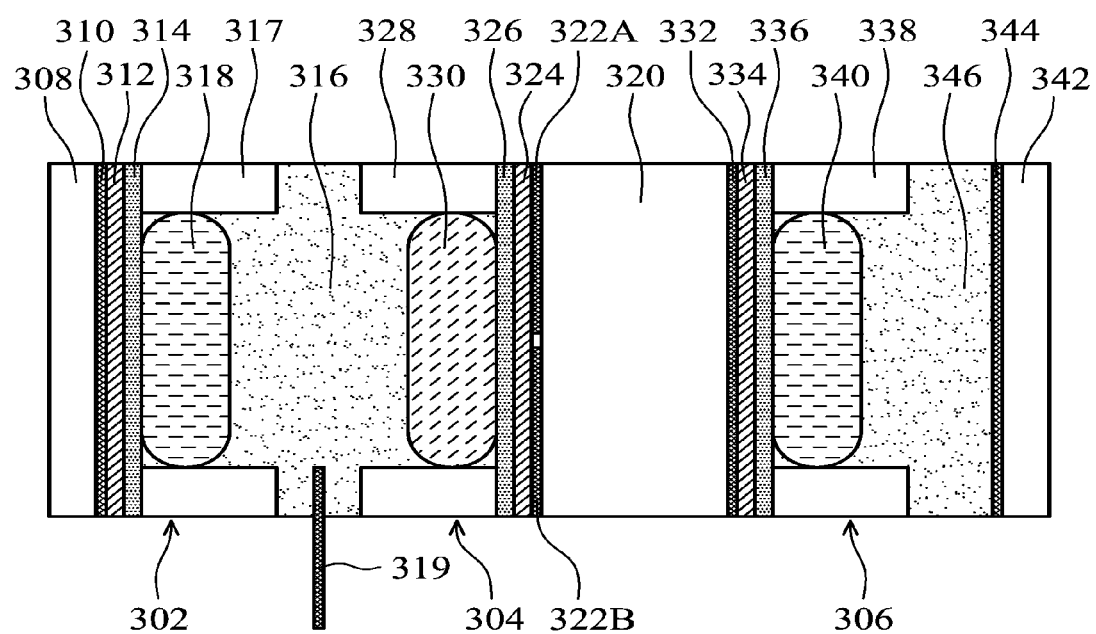
FIG. 3 shows a dual displaying structure of a second embodiment of the invention.

FIG. 3 shows a dual display of the second embodiment of the invention. Unlike the embodiment shown in FIG. 1 using a polymer dispersed liquid crystal device as a transmissive reflective switching device, this embodiment uses an electrowetting display device including a white color non-polar reflective liquid as the transmissive reflective mode switching device.

As shown in FIG. 3, the dual display of the embodiment includes three electrowetting display devices, wherein the third electrowetting display device 304 between the first electrowetting display device 302 and the second electrowetting display device 306 serves as a transmissive reflective mode switching device. In the first electrowetting display device 302, a patterned electrode 310 is formed on a first substrate 308, a common substrate 320 opposite the first substrate 308, and a hydrophilic wall 317, a polar liquid 316, a non-polar liquid 318 and a common electrode 319 are disposed between the first substrate 308 and the common substrate 320. In the third electrowetting display device 304, a first patterned electrode 322A and a second patterned electrode 322B are formed on a common substrate 320, a dielectric layer 324 is formed on the first and second patterned electrode 322A, 322B, a hydrophobic layer 326 is formed on the dielectric layer 324, and a hydrophilic wall 328 and a non-polar liquid 330 having reflective characteristics is formed on the hydrophobic layer 326. The electrode 310, 322A, 322B can be ITO, IZO or ZnO. The dielectric layer 312, 324 can be silicon nitride, silicon oxide, aluminum nitride titanium, oxide or the combination of these materials. The hydrophobic layer 314, 326 can be a macromolecule including fluorine, diamond-like carbon thin film or self assembled monolayer. The hydrophilic wall 317, 328 can be a resist material, such as epoxy resin or acrylic resin. The non-polar liquid 318, 330 can comprise silicon oil, $C_{10}$-$C_{16}$ alkane (such as decane, dodecane, tetradecane or hexadecane), dye or pigment or lumophore. and the polar liquid 316 can be water, alcohol or electrolyte-containing water. It is noted that the first electrowetting display device 302 and the third electrowetting display device 304 together uses the common electrode 319 and the polar liquid 316.

Elements of the second electrowetting display device 306 are substantially the same as that of the first electrowetting display device 302. Referring to FIG. 3, in the second electrowetting display device 306, a patterned electrode 332 is formed on a the other side of the common substrate 320, and a dielectric layer 334 is formed on the electrode 332, a hydrophobic layer 336 is formed on the dielectric layer 334, a second substrate 342 is opposite to the common substrate 320, a common electrode 344 is formed on the 342, and a hydrophilic wall 338, a polar liquid 346 and a non-polar liquid 340 is disposed between the second substrate 342 and the common substrate 320.

Figure 4A:
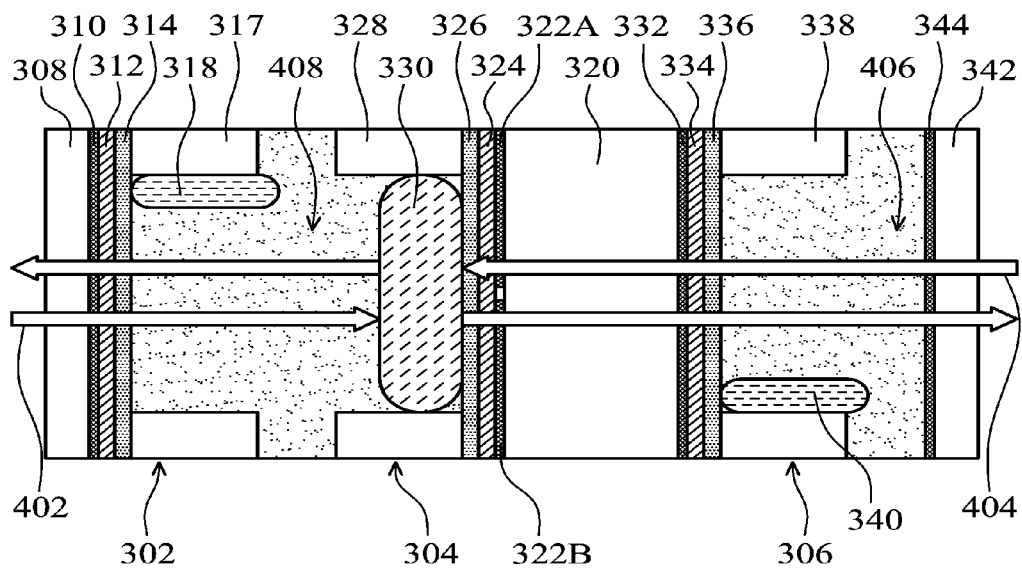
FIG. 4A~FIG. 4G illustrates operation of a dual display of the second embodiment of the invention.
Figure 4B:
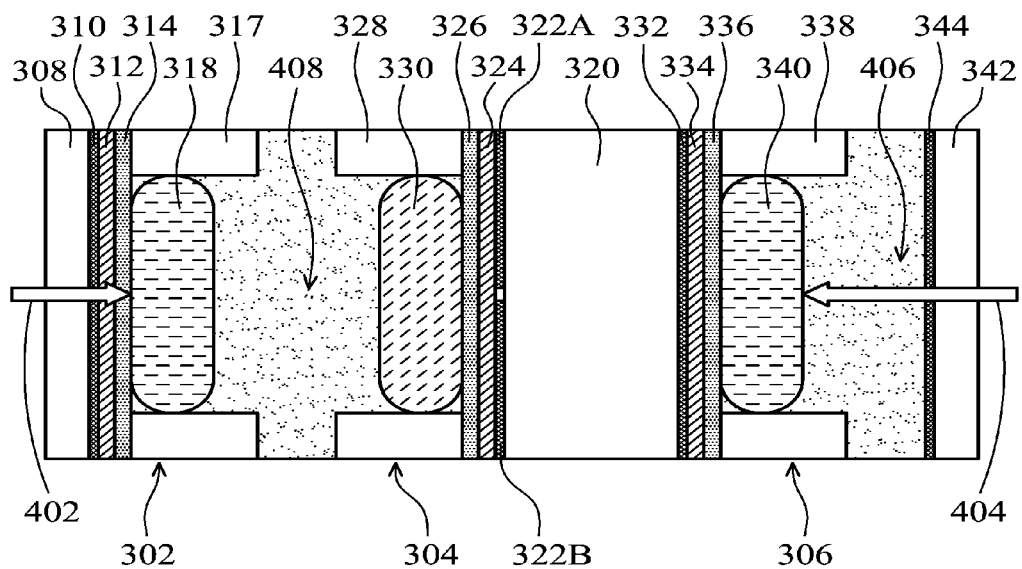

The operation of the dual display of the embodiment is illustrated in accordance with FIG. 4A~FIG. 4G, wherein the first electrowetting display device can face a first viewing side and second electrowetting display device can face a second viewing side. First, referring to FIG. 4A, when the third electrowetting display device 304 is not applied with voltage, the non-polar liquid 330 having reflective characteristics remains evenly distributed in a pixel to form a reflective plate reflecting ambient light 402 and 404. Both the first electrowetting display device 302 and the second electrowetting display device 306 are reflective displays at this moment. FIG. 4A shows the dual display when the first display pixel 408 is turned on (applied with voltage) and the second display pixel 406 is turned on (applied with voltage). FIG. 4B shows the dual display when the first display pixel 408 is turned off (not applied with voltage) and the second display pixel 406 is turned off (not applied with voltage).

Figure 4C:
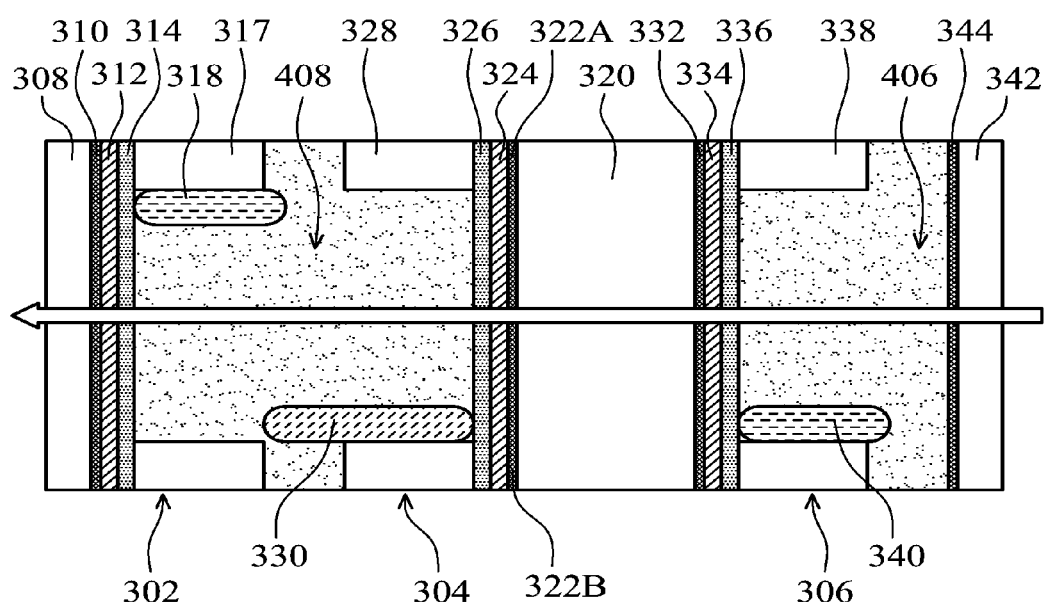

Referring to FIG. 4C, when both the first and second patterned electrode 322A, 322B in pixels of the third electrowetting display device 304 are applied with voltage, the non-polar liquid 330 having reflective characteristics shrinks. Therefore, the third electrowetting display device 304 presents a transmissive mode, and both the first electrowetting display device 302 and the second electrowetting display device 306 are transmissive displays at this moment. The non-polar liquid in one of first and second electrowetting display device 302, 306 of the dual display can be optionally controlled to shrink, and the non-polar liquid in another one of the first and second electrowetting display device 302, 306 of the dual display can be optionally controlled to display images for the dual display to perform transmissive displaying. Alternatively, both the first electrowetting display device 302 and the second electrowetting display device 306 can be driven so that the non-polar liquid shrinks, such that the dual display presents a full transmissive mode. As shown in FIG. 4C, when both the first display pixel 408 and the second display pixel 406 are turned on (applied with voltage), the dual display of the embodiment is switched to a full transmissive mode.

Figure 4D:
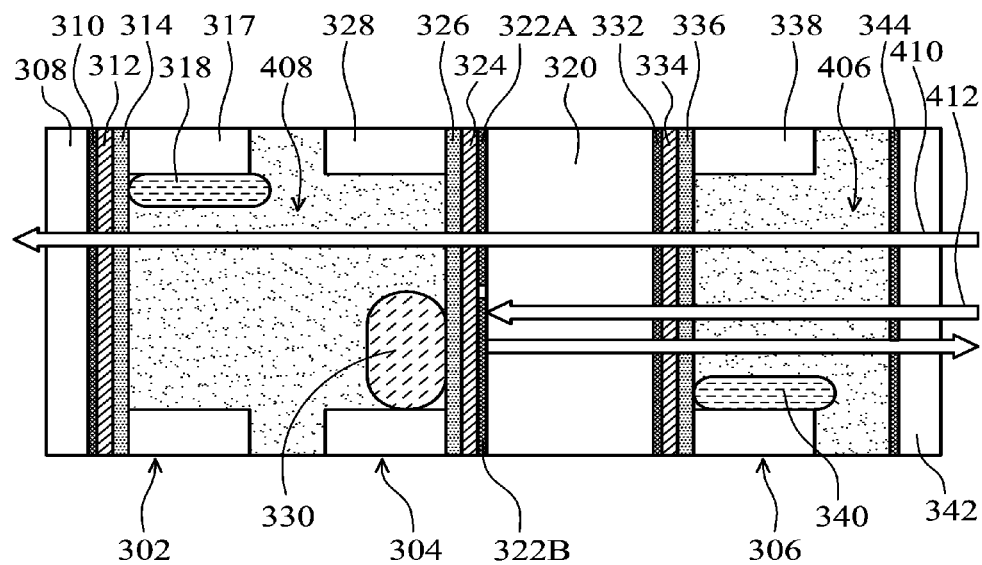
Figure 4E:
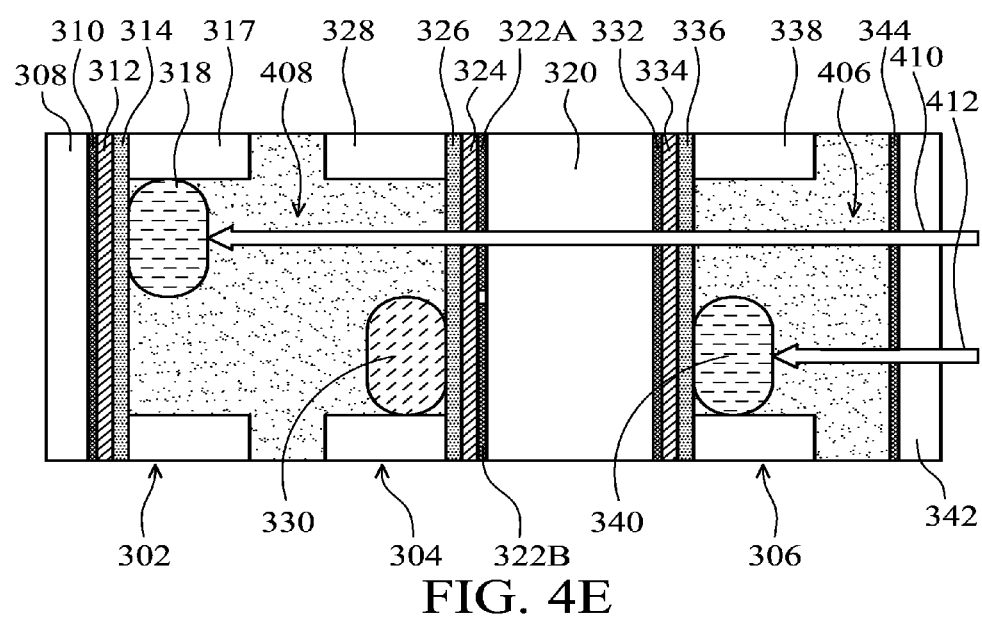

Referring to FIG. 4D and FIG. 4E, when the first patterned electrode 322A in the top half portion of a pixel of the third electrowetting display device 304 is applied with voltage, and the non-polar liquid 330 having reflective characteristics move downward in the pixel, the top half portion of the pixel is a transmissive region and the bottom half portion of the pixel is a reflective region. The non-polar liquid 318 of the first electrowetting display device 302 is controlled by the patterned electrode 310 to operate at the top half portion of the pixel. The first electrowetting display device 302 presents a transmissive display wherein it's light source can be ambient light 410 passing through the second electrowetting display device 306. The non-polar liquid 340 of the second electrowetting display device 306 is controlled by the patterned electrode 332 to operate at the bottom half portion of the pixel. The second electrowetting display device 306 presents a reflective display wherein its light source can be reflective ambient light 412. As shown in FIG. 4D, when the first display pixel 408 and the second display pixel 406 are turned on, an ambient light 410 passes through the top half portion of the third electrowetting display device 304 to serve as a light source of the first electrowetting display device 302. In addition, an ambient light 412 is reflected by the bottom half portion of the third electrowetting display device 304 to serve as a light source of the second electrowetting display device 306. FIG. 4E shows the state when the first display pixel 408 and the second display pixel 406 are turned off.

Figure 4F:
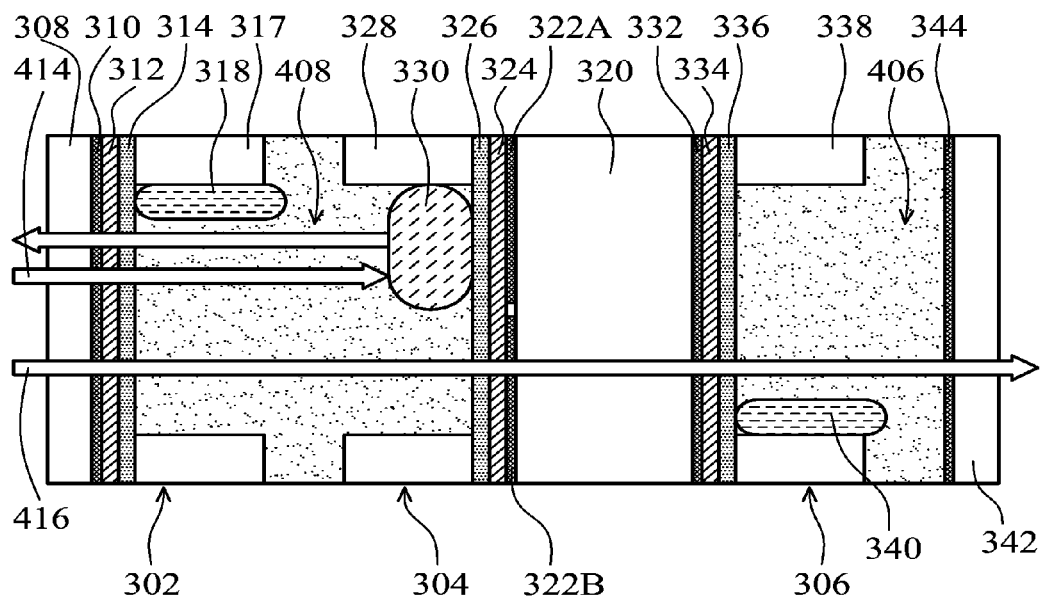
Figure 4G:
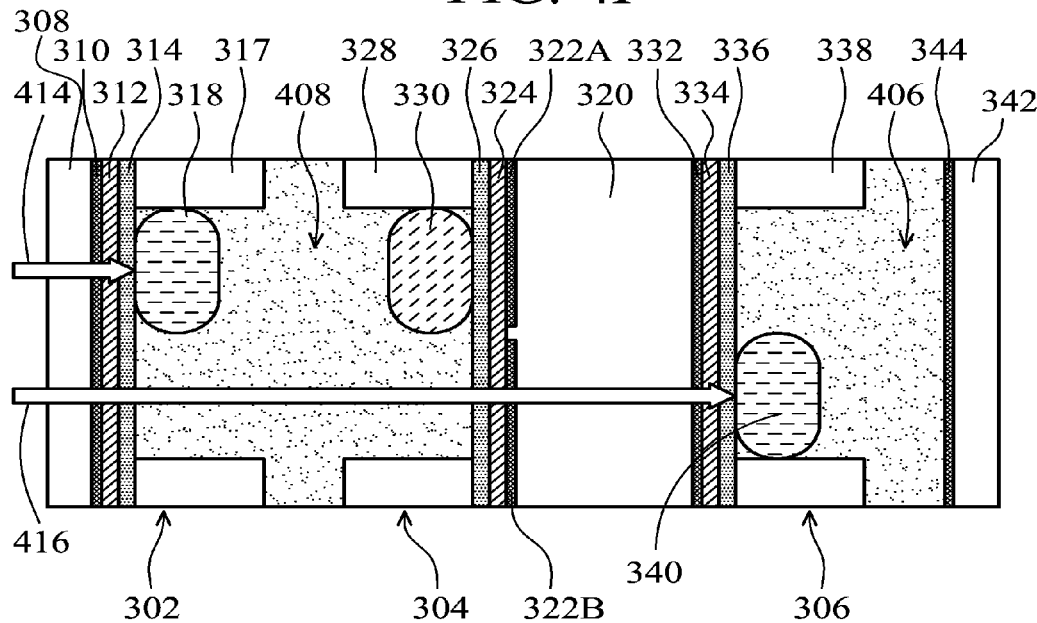

Referring to FIG. 4F and FIG. 4G, the second patterned electrode 322B at the bottom half portion of the pixel of the third electrowetting display device 304 is applied with voltage for the non-polar liquid 330 having reflective characteristics to move toward the top half portion of the pixel. The top half portion of the pixel is a reflective region and the bottom half portion of the pixel is a transmissive region. The non-polar liquid 318 of the first electrowetting display device 302 is controlled by the patterned electrode 310 to operate at the top half portion of the pixel, and the first electrowetting display device 302 presents a reflective display wherein it's light source can be ambient light 414. The non-polar liquid 340 of the second electrowetting display device 306 is controlled by the patterned electrode 332 to operate at the bottom half portion of the pixel, and the second electrowetting display device 306 presents a transmissive display wherein it's light source can be ambient light 416 passing through the first electrowetting display device 302. As shown in FIG. 4F, when the first display pixel 408 and the second display pixel 406 are turned on, an ambient light 416 passes through the bottom half portion of the third electrowetting display device 304 to serve as a light source of the second electrowetting display device 306. In addition, an ambient light 414 is reflected by the top half portion of the third electrowetting display device 304 to serve as a light source of the first electrowetting display device 302. FIG. 4G shows the state when the first display pixel 408 and the second display pixel 406 are turned off.

Figure 5:
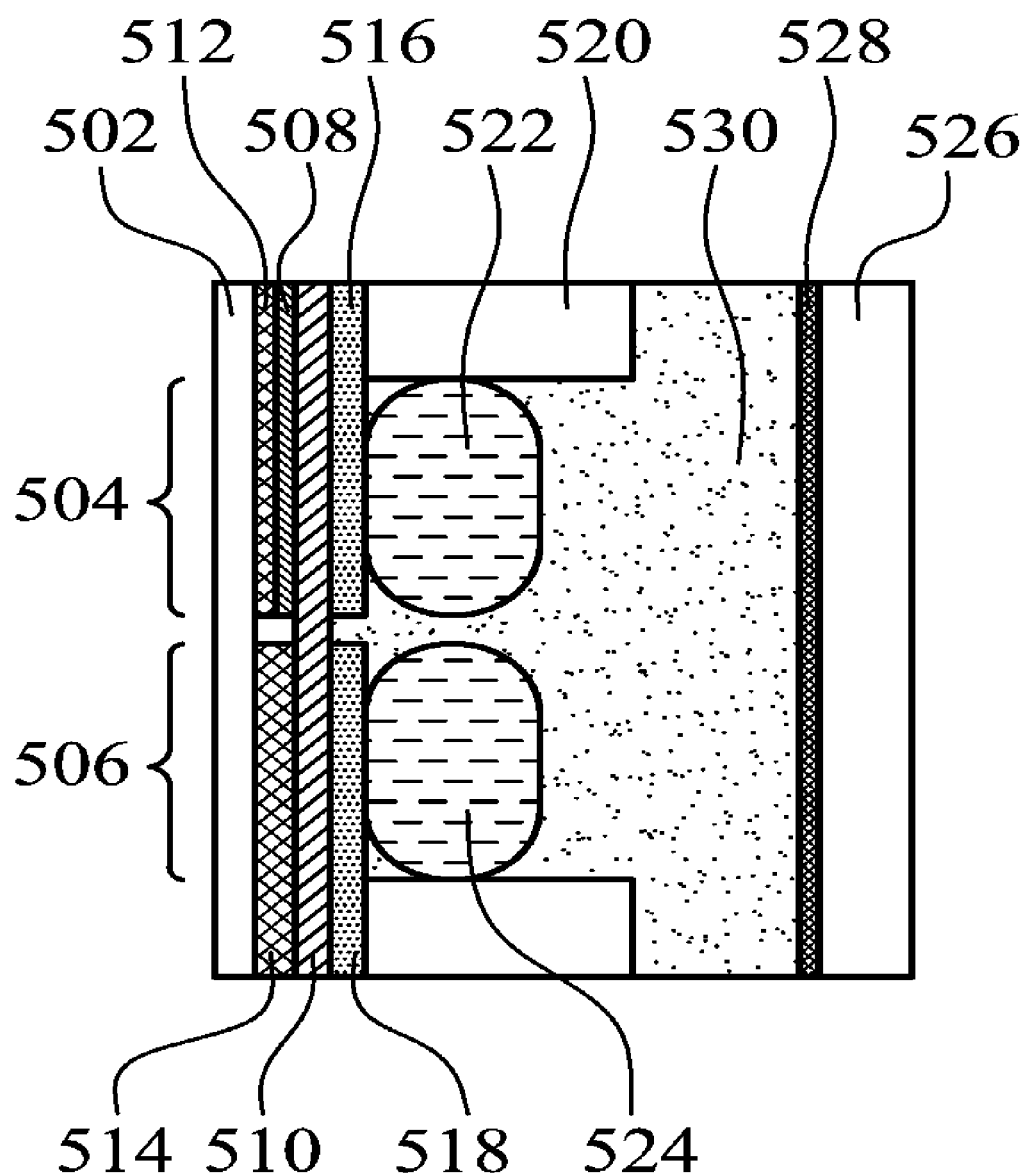
FIG. 5 shows a dual displaying structure of a third embodiment of the invention.

FIG. 5 shows a dual display of the third embodiment of the invention. Unlike the embodiments shown in FIG. 1 and FIG. 3 including reflection transmission switching devices, in FIG. 5, a reflective layer is disposed in a portion of a pixel region of the dual display for the single device to present a reflective mode, a transmissive mode or a transflective mode according to requirements or ambient light illumination direction. Referring to FIG. 5, in the dual display of the embodiment, a first patterned electrode 512 and a second patterned electrode 514 are disposed on a first substrate 502, wherein the first patterned electrode 512 is connected to a first TFT (not shown), and the second patterned electrode 514 is connected to a second TFT (not shown). A reflective layer 508 is disposed on the first patterned electrode 512. The dual display of the embodiment has a reflective region 504 corresponding to position where the reflective layer 508 is formed and has a transmissive region 506 corresponding to position where the reflective layer is not formed. A dielectric layer 510 is disposed on the reflective layer 508, the first patterned electrode 512 and the second patterned electrode 514. The first substrate 502 can be glass or plastic. The first patterned electrode 512 can be transparent electrodes such ITO, IZO or ZnO or conductive metal such as aluminum or silver and the second patterned electrode 514 can be transparent electrodes such ITO, IZO or ZnO. The reflective layer 508 can be metal such as aluminum or silver, or white material with high reflectivity such as titanium oxide. The dielectric layer 510 can be silicon nitride, silicon oxide, aluminum oxide, titanium oxide or the combination of these materials, etc. In an important feature of the embodiment, a first patterned hydrophobic layer 516 and a second patterned hydrophobic layer 518 are formed on the dielectric layer 510, and due to the separated first and second hydrophobic layers 516, 518, the first non-polar liquid 522 and the second non-polar liquid 524 can be operated independently on the separated first and second hydrophobic layers 516, 518. For example, in an embodiment of the invention, the first TFT (not shown) electrically connecting the first patterned electrode 512 and the second TFT (not shown) electrically connecting the second patterned electrode 514 can control the first non-polar liquid 522 and the second non-polar liquid 524 respectively. In addition, the first and second non-polar liquids 522, 524 disposed in different regions of a single pixel can have the same or different color, thickness or concentration of dye, pigment, or lumophore. A second substrate 526 is opposite to the first substrate 502. A common electrode 528 is disposed on the second substrate 526. A hydrophilic wall 520 is disposed on the first patterned hydrophobic layer 516 and the second patterned hydrophobic layer 518. A polar liquid 530 is filled into the region between the common electrode 528 and the hydrophilic wall 520. The second substrate 526 can be glass or plastic. The common electrode 528 can be transparent electrodes such ITO, IZO or ZnO. The non-polar liquids 522, 524 can comprise silicon oil, $C_{10}$-$C_{16}$ alkane (such as decane, dodecane, tetradecane or hexadecane), dye, pigment or lumophore. The polar liquid 530 can be water, alcohol or electrolyte-containing liquid. The hydrophilic wall 520 can be resist material, such as epoxy resin or acrylic resin. The first and second patterned hydrophobic layers 516, 518 can be a macromolecule including fluorine, diamond-like carbon thin film or self assembled monolayer.

Figure 6A:
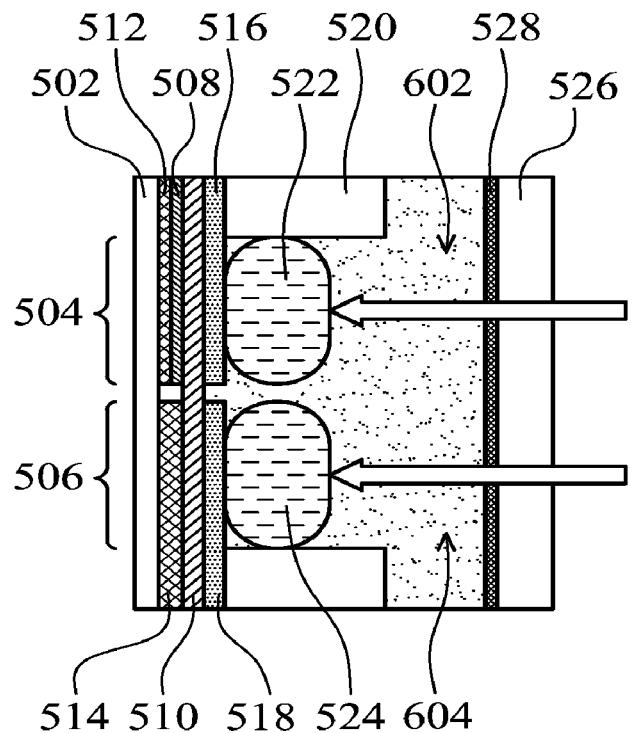
FIG. 6A~FIG. 6D illustrates operation of a dual display of the third embodiment of the invention.
Figure 6B:
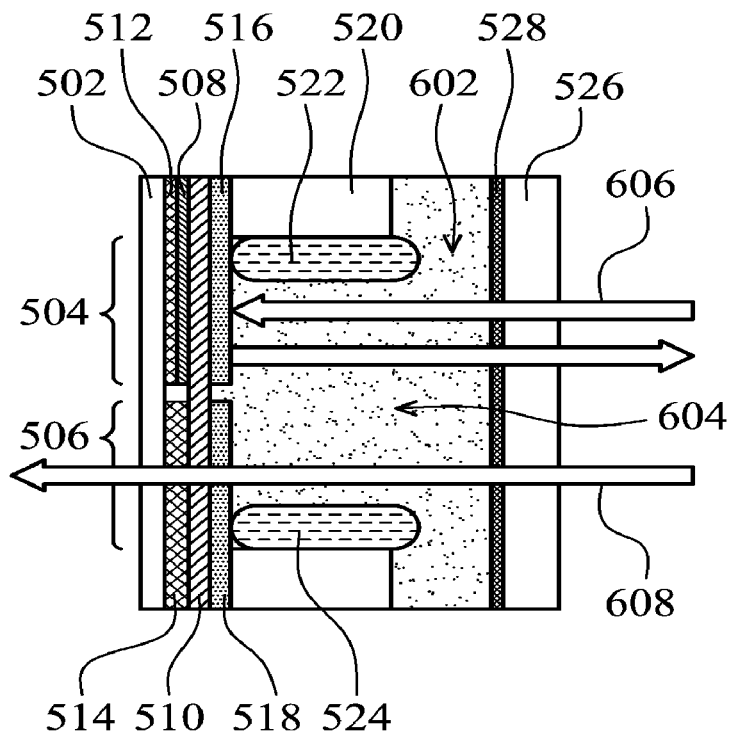

The operation of the dual display of the embodiment is illustrated in accordance with FIG. 6A~FIG. 6D. Referring to FIG. 6A and FIG. 6B, the non-polar liquids 522 and 524 are respectively disposed in the reflective region 504 and the transmissive region 506 on the separated first patterned hydrophobic layer 516 and the second patterned hydrophobic layer 518 and are driven with different TFTs (not shown). FIG. 6A shows the state when the first display pixel 602 and the second display pixel 604 are turned off (not applied with voltage), wherein the first non-polar liquid 522 and the second non-polar liquid 524 lie in the pixel. FIG. 6B shows the state when the first display pixel 602 and the second display pixel 604 are turned on (applied with voltage), wherein the first non-polar liquid 522 and the second non-polar liquid 524 shrink toward the hydrophilic wall 520. The reflective layer 508 in the reflective region 504 can reflect ambient light 606 for the first display pixel 602 of the dual display of the embodiment to be presented in a reflective mode. The viewing side is at the second substrate 526 side. An ambient light 608 passes through the transmissive region 506 to provide a light source required by the second display pixel 604 for the display to be presented in a transmissive mode. The viewing side is at the first substrate 502 side. The operation in FIG. 6B is suitable for the application of a dual display. In other words, the display can be viewed at two opposite sides, wherein one side shows an image presented by the first display pixel 602 in a reflective mode, and the other side shows an image presented by the second display pixel 604 in a transmissive mode. The ambient light 606 passes through the non-polar liquid 522 in the reflective region twice, but the ambient light 608 passes through the non-polar liquid 524 in the transmissive region only once. In order for the reflective mode and the transmissive mode to presents best image qualities, the non-polar liquid 522 in the reflective region can have thickness or concentration of dye, pigment or lumophore less than or equal to the non-polar liquid 524 in the transmissive region. In addition, in order to have broader display application, colors of the non-polar liquids 522 and 524 can be different. Specifically, one of the colors of the non-polar liquids 522 and 524 can be black, such that the dual display can present colorful images on one side, and present black and white pictures on the other side.

Figure 6C:
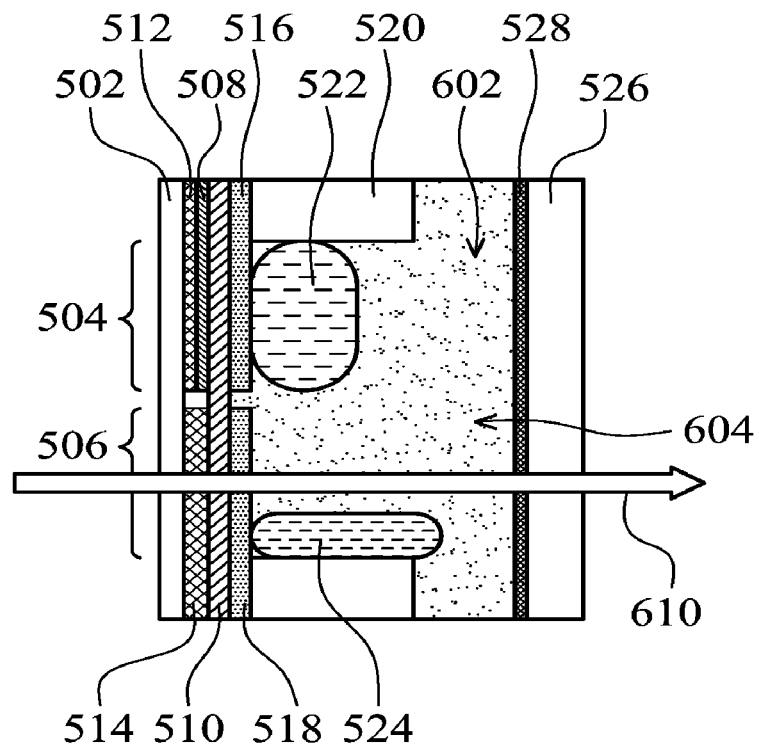

Referring to FIG. 6C, when the light source 610 is at the first substrate 502 side, the second display pixel 604 can display in a transmissive mode and the viewing side is at the second substrate 526 side. When the second display pixel 604 is applied with voltage, the second non-polar liquid 524 shrinks toward the hydrophilic wall 520 and the first display pixel 602 can be not applied with voltage for the first non-polar liquid 522 to remain in the reflective region.

Figure 6D:
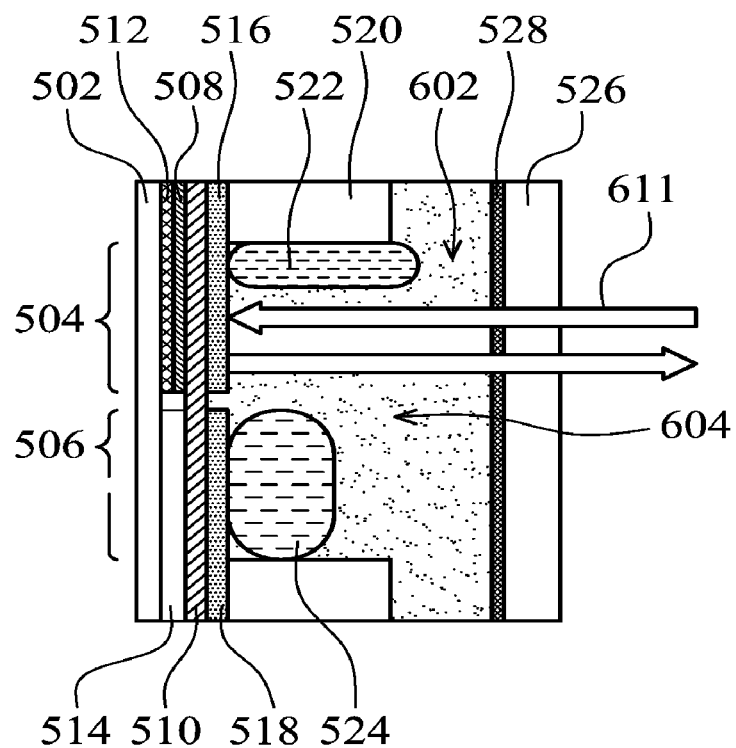

Referring to FIG. 6D, when two sides of the dual display have light source have substantially the same illumination, the first display pixel 602 can display in a reflective mode. The viewing side is at the second substrate 526 side and the light source is 611. The second display pixel 604 can be not applied with voltage for the second non-polar liquid 524 to remain in the transmissive region 506.

While the invention has been described by way of example and in terms of the preferred embodiments, it is to be understood that the invention is not limited to the disclosed embodiments. For example, the described first and second electrowetting display devices are not limited to electrowetting display device, but can be replaced with other display device which can be switched to a transmissive mode or reflective mode, such as a cholesteric liquid crystal display device, electrophoretic display device or electrochromic display device. In addition, the reflection transmission switching device between the first and second display devices is not limited only to a polymer dispersed liquid crystal device or an electrowetting display device, but can also be an electrochromic display device. The invention is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A dual display, comprising:
   a first electrowetting display device and a second electrowetting display device; and
   a reflection transmission switching device between the first electrowetting display device and the second electrowetting display device,
   wherein the first electrowetting display device and the second electrowetting display device have a function of displaying images and can be switched to a transmissive mode, wherein the first electrowetting display device faces a first viewing side and the second electrowetting display device faces a second viewing side.

2. The dual display as claimed in claim 1, wherein the reflection transmission switching device is a polymer dispersed liquid crystal device.

3. The dual display as claimed in claim 1, wherein when the polymer dispersed liquid crystal device is not applied with voltage, the first electrowetting display device facing the first viewing side and the second electrowetting display device facing the second viewing side are reflective display devices.

4. The dual display as claimed in claim 1, wherein when the polymer dispersed liquid crystal device is applied with voltage, and both the first electrowetting display device facing the first viewing side and the second electrowetting display device facing the second viewing side are turned on, the electrowetting display device is in a full transmissive mode.

5. The dual display as claimed in claim 1, wherein the polymer dispersed liquid crystal device comprises a first patterned electrode on a top half portion of a pixel of the dual display, a second patterned electrode on a bottom half portion of the pixel of the dual display, a common electrode and a polymer dispersed liquid crystal layer among the first and second patterned electrodes and the common electrode.

6. The dual display as claimed in claim 5, wherein both the first electrowetting display device facing the first viewing side and the second electrowetting display device facing the second viewing side comprise patterned electrodes, a non-polar liquid of the first electrowetting display device is controlled by its patterned electrode to operate at the top half portion of the pixel, and a non-polar liquid of the second electrowetting display device is controlled by its patterned electrode to operate at the bottom half portion of the pixel.

7. The dual display as claimed in claim 6, wherein when the polymer dispersed liquid crystal layer of the polymer dispersed liquid crystal device is applied with voltage through the first patterned electrode and the common electrode thereof, a portion of the polymer dispersed liquid crystal layer corresponding to the first patterned electrode is transparent, the first electrowetting display device is a transmissive display and the second electrowetting display device is a reflective display.

8. The dual display as claimed in claim 6, wherein when the polymer dispersed liquid crystal layer of the polymer dispersed liquid crystal device is applied with voltage through the second patterned electrode and the common electrode thereof, a portion of the polymer dispersed liquid crystal layer corresponding to the second patterned electrode is transparent, the first electrowetting display device is a reflective display and the second electrowetting display device is a transmissive display.

9. The dual display as claimed in claim 1, wherein the reflection transmission switching device is a third electrowetting display device.

10. The dual display as claimed in claim 9, the third electrowetting display device and the first electrowetting display device uses the same common electrode, and the third electrowetting display device comprises a non-polar liquid having reflective characteristics.

11. The dual display as claimed in claim 9, wherein the third electrowetting display device comprises a first patterned electrode in a top half portion of a pixel of the dual display and a second patterned electrode in bottom half portion of the pixel of the dual display.

12. The dual display as claimed in claim 10, wherein when the third electrowetting display device is not applied with voltage, the non-polar liquid having reflective characteristics remains evenly distributed in the pixel of the dual display to form a reflective plate, and the first electrowetting display device and the second electrowetting display device are reflective displays.

13. The dual display as claimed in claim 11, wherein, wherein when the third electrowetting display device is applied with voltage through the first and second patterned electrodes, the non-polar liquid having reflective characteristics shrinks, and the first electrowetting display device and the second electrowetting display device are transmissive displays.

14. The dual display as claimed in claim 11, wherein when the first patterned electrode at the top half portion of the pixel of the third electrowetting display device is applied with voltage, the non-polar liquid having reflective characteristics move toward the bottom half portion of the pixel, the top half portion of the pixel presents a transmissive region, and the bottom half portion of the pixel presents a reflective region.

15. The dual display as claimed in claim 14, wherein the non-polar liquid of the first electrowetting display device is controlled to operate at the top half portion of the pixel, the non-polar liquid of the second electrowetting display device is controlled to operate at the bottom half portion of the pixel, the first electrowetting display device presents a transmissive display, and the second electrowetting display device presents a reflective display.

16. The dual display as claimed in claim 11, wherein when the second patterned electrode at the bottom half portion of the pixel of the third electrowetting display device is applied with voltage, the non-polar liquid having reflective characteristics move toward the top half portion of the pixel, the bottom half portion of the pixel presents a transmissive region, and the top half portion of the pixel presents a reflective region.

17. The dual display as claimed in claim 16, wherein the non-polar liquid of the first electrowetting display device is controlled to operate at the top half portion of the pixel, the non-polar liquid of the second electrowetting display device is controlled to operate at the bottom half portion of the pixel, the first electrowetting display device presents a reflective display, and the second electrowetting display device presents a transmissive display.

18. The dual display as claimed in claim 1, wherein the non-polar liquids of the first and second electrowetting display devices disposed in different pixels have different colors.

19. A dual display, comprising:
    a first substrate;
    a second substrate opposite the first substrate;

a first patterned electrode and a second patterned electrode disposed on the first substrate;

a reflective layer disposed on the first patterned electrode;

a first patterned hydrophobic layer over the first patterned electrode;

a second patterned hydrophobic layer over the second patterned electrode;

a first non-polar liquid disposed on the first patterned hydrophobic layer; and a second non-polar liquid disposed on the second patterned hydrophobic layer wherein a side of the first substrate provides a first display device facing a first viewing side and a side of the second substrate provides a second display facing a second viewing side.

20. The dual display as claimed in claim 19, wherein the first patterned electrode is electrically connected to a first thin film transistor, the second patterned electrode is electrically connected to a second thin film transistor, and the first non-polar liquid and the second non-polar liquid are respectively controlled by the first thin film transistor and the second thin film transistor.

21. The dual display as claimed in claim 19, wherein the first non-polar liquid has a thickness equal to or less than that of the second non-polar liquid.

22. The dual display as claimed in claim 19, wherein the first non-polar liquid has a concentration of dye, pigment or lumophore or equal to or less than that of the second non-polar liquid.

23. The dual display as claimed in claim 19, wherein the first non-polar liquid and the second non-polar liquid disposed in the same pixel have different colors.

24. The dual display as claimed in claim 23, wherein the first display device and the second display device can be cholesteric liquid crystal display devices, electrophoretic display devices or electrochromic display devices.

25. The dual display as claimed in claim 23, wherein the reflection transmission switching device can be an electrowetting display device, a polymer dispersed liquid crystal device or an electrochromic display devices.

26. A dual display, comprising:

a first display device and a second display device; and a reflection transmission switching device between the first display device and the second display device, wherein when the first and second display device and the reflection transmission switching device are switched to a transmissive mode, the entire dual display is transparent;

when the reflection transmission switching device is switched to a reflective mode, the first and second display devices can display different images, and when the reflection transmission switching device is switched to a transflective mode, the first and second display devices can be presented as a transmissive display and a reflective display respectively, wherein the first display device faces a first viewing side and the second display device faces a second viewing side.

* * * * *